United States Patent
Kuiper et al.

(10) Patent No.: US 12,242,050 B2
(45) Date of Patent: Mar. 4, 2025

(54) CONTROLLABLY DEFORMABLE MIRROR DEVICE

(71) Applicant: Nederlandse Organisatie voor toegepast-natuurwetenschappelijk onderzoek TNO, 's-Gravenhage (NL)

(72) Inventors: Stefan Kuiper, 's-Gravenhage (NL); Jan Roelof Nijenhuis, Delft (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 601 days.

(21) Appl. No.: 17/613,802

(22) PCT Filed: May 28, 2020

(86) PCT No.: PCT/NL2020/050344
§ 371 (c)(1),
(2) Date: Nov. 23, 2021

(87) PCT Pub. No.: WO2020/242310
PCT Pub. Date: Dec. 3, 2020

(65) Prior Publication Data
US 2022/0252864 A1    Aug. 11, 2022

(30) Foreign Application Priority Data
May 28, 2019 (EP) .................... 19177051

(51) Int. Cl.
*G02B 26/08* (2006.01)
(52) U.S. Cl.
CPC ............... *G02B 26/0825* (2013.01)
(58) Field of Classification Search
CPC ......... G02B 26/0825; G02B 26/085; G02B 26/0833; G02B 26/0858; G02B 26/0841;
(Continued)

(56) References Cited

U.S. PATENT DOCUMENTS

| | | | | | |
|---|---|---|---|---|---|
| 4,940,318 A | * | 7/1990 | Ealey | .................... | G02B 26/06 |
| | | | | | 359/849 |
| 5,357,825 A | * | 10/1994 | Costello | ............... | H10N 30/886 |
| | | | | | 359/849 |

(Continued)

FOREIGN PATENT DOCUMENTS

| EP | 1923730 A1 | 5/2008 |
|---|---|---|
| JP | 2003-302568 A | 10/2003 |
| WO | WO 2011/129694 A1 | 10/2011 |

OTHER PUBLICATIONS

European Patent Office, International Search Report in corresponding International Application No. PCT/NL2020/050344, dated Sep. 28, 2020 (3 pages).

(Continued)

*Primary Examiner* — Darryl J Collins
*Assistant Examiner* — Matthew Y Lee
(74) *Attorney, Agent, or Firm* — Leydig, Voit & Mayer, Ltd.

(57) ABSTRACT

A deformable mirror device has a flexible layer with a front surface that forms a mirror surface or to which a mirror layer forming mirror surface is attached. The flexible layer consists homogeneously of a first material. Protrusions extend from the back surface of the flexible layer. The protrusions consist homogeneously of the first material or a material with substantially the same thermal expansion coefficient. A plurality actuators are coupled to the protrusions and via the protrusions to the flexible layer, to deform the flexible layer. The flexible layer and the protrusions may be part of an integral body of the first material, or bonded to the flexible layer. The distal end of each protrusion has a curved surface that at least partly has a spherical shape.

11 Claims, 3 Drawing Sheets

(58) Field of Classification Search
CPC ........ G02B 7/185; G02B 7/188; G02B 7/198; G11B 7/1362; G11B 7/13925; G03F 7/70266
See application file for complete search history.

(56) References Cited

U.S. PATENT DOCUMENTS

| | | | | |
|---|---|---|---|---|
| 5,434,697 | A * | 7/1995 | Ameer | G02B 26/0825 359/224.1 |
| 6,048,070 | A * | 4/2000 | LaFiandra | G02B 26/0825 359/845 |
| 2008/0117489 | A1 * | 5/2008 | Tanaka | G02B 26/0825 359/224.1 |
| 2008/0310287 | A1 | 12/2008 | Aoki et al. | |
| 2010/0078543 | A1 * | 4/2010 | Winker | G02B 26/0825 359/849 |
| 2011/0181852 | A1 * | 7/2011 | Bleidistel | G03F 7/70291 355/30 |
| 2013/0070356 | A1 * | 3/2013 | Camet | G02B 26/0825 359/849 |
| 2013/0076590 | A1 | 3/2013 | Baudasse et al. | |

OTHER PUBLICATIONS

Keigo Enya et al., "A Monolithic Deformable Mirror with Latchable Mechanical Actuation (Latchaman) for Space-Borne Telescopes," Visual Communications and Image Processing, vol. 9219 (Sep. 12, 2014) XP060039830.

Roger Hamelinck, "Adaptive deformable mirror: based on electromagnetic actuators," Eindhoven University of Technology, Eindhoven: Technische Universiteit Eindhoven DOI: 10.6100/IR675512, pp. 1-251 (2010).

P-Y Madec, "Overview of Deformable Mirror Technologies for Adaptive Optics and Astronomy," European Southern Observatory, Karl Schwarzschild Str 2, D-85748, Garching, pp. 1-18 (2012).

B. Crepy, "The M4 Adaptive Unit for the E-ELT," 1st AO4ELT conference, 06001 (2010) DOI:10.1051/ao4elt/201006001, pp. 06001-p. 1 to 06001-p. 6.

European Patent Office, Intention to Grant in corresponding European Patent Application No. 20731242.2 dated Mar. 15, 2023.

* cited by examiner

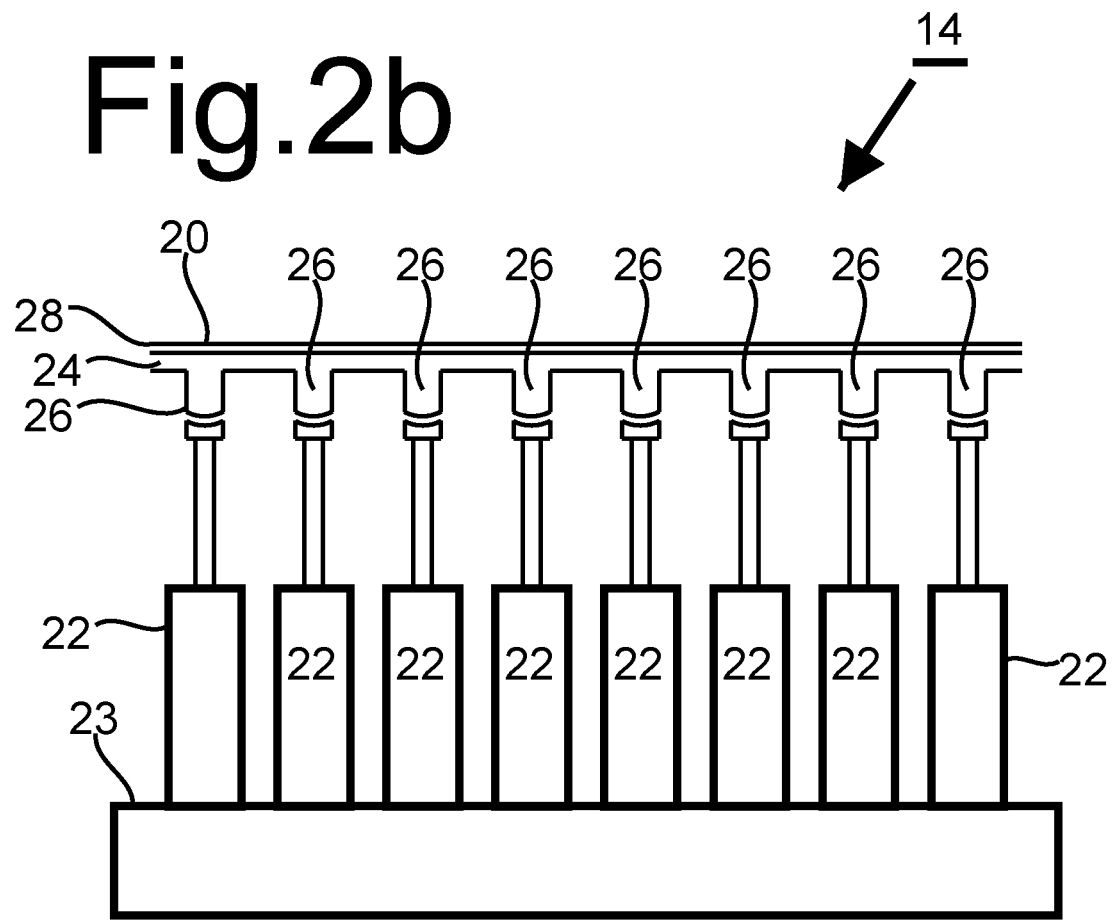

CONTROLLABLY DEFORMABLE MIRROR DEVICE

CROSS-REFERENCE TO RELATED APPLICATIONS

This patent application is a U.S. National Phase of PCT International Application No. PCT/NL2020/050344, filed May 28, 2020, which claims priority to European Application No. 19177051.0, filed May 28, 2019, which are both expressly incorporated by reference in their entireties, including any references contained therein.

FIELD OF THE INVENTION

The invention relates to a mirror device with a controllably deformable mirror and an optical system comprising such a device.

BACKGROUND

Controllably deformable mirrors are known for use to adjust the phase patterns of wave fronts, for example to compensate for the effect of turbulence along the optical path. WO2011129694 and the references cited therein describe controllably deformable mirrors. The controllably deformable mirror comprises a flexible mirror surface and a large number of actuators to push and pull the mirror surface forward or backward at an array of points at the back of the mirror surface. For each point in the array an actuator is used that has a base part on a support and a moving (i.e. movable) part attached to the point on an actuated layer, which may be the flexible mirror itself or an intermediate flexible layer to which the flexible mirror is attached. The moving parts are moved by forces excited from the base parts, for example using electric current through coils in the base part to create magnetic fields that act on magnets in the moving parts.

Various ways of attaching the moving parts to the actuated layer are known. The moving part may be bonded to the actuated layer by means of adhesive, epoxy cement or a frit bond. Electrostatic or magnetic clamping between the moving parts and the actuated layer may be used to couple the moving parts to the actuated layer. U.S. Pat. No. 5,719,846 discloses use of electrostatic clamping.

Although the actuators provide for deformations that can be controlled to create desirable adjustments of wave fronts, the attachment of the moving parts can also result in undesired deformations, with uncontrolled detrimental effects on the wave fronts. The actual deformations of the mirror depend on the shape of the moving parts. The regions in the mirror behind which the moving parts are attached are less flexible than regions between the attachments of the moving parts. The attachment can create local deformation. Moreover, the attachments can create temperature dependent strain that deforms the mirror surface. Each can create local deformation of the mirror with much higher spatial frequency components than can not be compensated by controlled deformation. This negatively affects the quality of the adjustment of the phase patterns of wave fronts.

EP1923730 discloses a deformable mirror device wherein the thickness of the device is reduced by using actuators that extend through holes in the mirror supporting member. The supporting member is bonded to the mirror substrate by anodic bonding or other forms of bonding. The actuators are contracted and expanded inside the bonded part of the supporting member. The actuator is not bonded to the mirror substrate to avoid distortion, but if the occurrence of the distortion is not a problem, the actuator may be bonded to the mirror substrate.

US2008310287 discloses a deformable mirror apparatus that uses a magnet and a driving coil to deform the mirror as a whole. opposite surface of the mirror a flexible member is provided. to realize a convex thickness variation, e.g. in ellipses that increase in thickness from the edge of the mirror to its center. This imparts a predetermined strength distribution on the flexible member. The strength distribution determines the pattern of deformation when the magnet and a driving coil to deform the mirror.

Manufacture of a deformable mirror from a monolithic cuboid of aluminum by 3D crossed hollowing using electrical discharge machining is described in an article by Enya Keigo et al (EPO reference XP060039830) titled "a monolithic deformable mirror with latchable mechanical actuation (LATCHAMAN) for space-born telescope", published in Visual communications and image processing Vol 9219 pages 92190P-9219P. It is described that use of a monolithic structure means that the structure is free from deformation cause by mismatch of thermal expansion coefficients of different materials that can cause deformation on cooling. Deformation is performed by using a screwdriver to turn screws inserted into holes in the main body in order to avoid a strong temperature dependent actuation mechanism.

SUMMARY

Among others it is an object to improve the quality of adjustments of the phase patterns that can be applied to wave fronts by a mirror device with a controllably deformable mirror.

A deformable mirror device as claimed in claim 1 is provided. The protrusions extend from the back surface, that is from the interpolation from the surface outside the protrusions to positions under the protrusions. The actuators are connected only at the distal end surface of the protrusions (distal from the back surface of the flexible layer). By using a protrusion of the same material as the flexible layer, or at least with a material that has substantially the same thermal expansion coefficient, between the back surface of the flexible layer and the moving part of the actuator, the position where differential thermal expansion or contraction occurs can be moved to a position that is distant from the back surface. Thus, the distortion effect of thermal expansion on the flexible layer is reduced. Of course, temperature variations can affect the length of the protrusions, and thus produce the normal deformations like those produced by means of movement of the actuators, but this can be compensated by adjusted control of the actuators. But local distortions, i.e. distortions that deviate from these normal deformations, are substantially avoided.

The convex-concave shape combination of the protrusions and the moving parts of the actuators make it easier to assemble the combination of the flexible layer, the protrusions and the moving part, in particular when the flexible layer has a curved surface, and the actuators are used to deform that curved surface. Moreover, this can be used to reduce local deformation of the flexible layer due to effect of the protrusions as torque arm that exerts a local torque on the flexible layer, and misalignment of the actuators with the protrusion.

In an embodiment, the distal end of each protrusion at least partly has a convex surface that at least partly has a spherical shape, and the distal ends of moving parts of the actuators have part-spherical concave surfaces with the same radius of curvature as the distal end of the protrusions. In another embodiment, the distal end of each protrusion at least partly has a concave surface that at least partly has a spherical shape, and the distal ends of moving parts of the actuators have part-spherical convex surfaces with the same radius of curvature as the distal end of the protrusions.

In an embodiment, the center of curvature of the spherical concave surface or surface part lies on or between the front and back surface of the flexible layer (i.e. the interpolation of the back surface outside the protrusions), and more preferably midway between the front and back surface of the flexible layer. This further reduces the distortion effect of misalignment.

Adhesive may be used on the distal ends of the protrusions to connect the protrusions to the actuators, but because such adhesive is at a distance from the flexible layer it has no local distortion effect, or at most a small local distortion effect, on the flexible layer. Such distortion effects, if any, decrease with the length of the protrusions. Preferably, the length of the protrusions is at least as large as half their diameter.

In an embodiment, the flexible layer and the protrusions are part of an integral body of the first material. Such an integral body can be manufactured for example by starting from a larger body of the first material that has a thickness that is at least a sum of the thickness of the flexible layer and the length of the protrusions, and selectively removing the part of the larger body between the protrusions to create the back surface of the flexible layer between the protrusions.

In another embodiment a layer of adhesive between the protrusions and the back surface of the flexible layer may be used to couple the protrusions to the back surface. Such a layer of adhesive can be kept thin and absent on the back surface of the flexible layer outside the circumference of the protrusion, so that its stiffness and thermal expansion coefficient have no significant effect on thermal deformation. Another method of manufacturing may comprise anodic bonding of the protrusions to the flexible layer. This eliminates the possibility of distortion due to the adhesive.

A method of manufacturing a deformable mirror device is provided. In this method, the deformable mirror surface is present on a front surface of a flexible layer. The method comprises manufacturing the flexible layer from a body of a first material by selectively removing the first material from said body to form a back surface of the flexible layer, the selective removing leaving protrusions extending from a back surface of the flexible layer, or attaching the protrusions of the first material, or of material with substantially the same thermal expansion coefficient, to the back surface. The actuators are coupled to the protrusions.

In an embodiment this may be done prior attaching the protrusions to the back surface of the flexible layer. the protrusions of the first material to the back surface In an embodiment, the protrusions may be attached to the back surface by anodic bonding, while they are pressed to the back surface by means of the moving parts, or by other struts.

In an embodiment, the protrusions may be attached to the back surface by adhesive, which cures while the protrusions are pressed to the back surface by means of the moving parts, or by other struts. Use of the moving parts for these purposes provides for self alignment during manufacture, which further reduces the risk of deformation.

BRIEF DESCRIPTION OF THE DRAWINGS

These and other objects and advantages will become apparent from a description of exemplary embodiments with reference to the following figures.

DETAILED DESCRIPTION OF EXEMPLARY EMBODIMENTS

Figure 1:
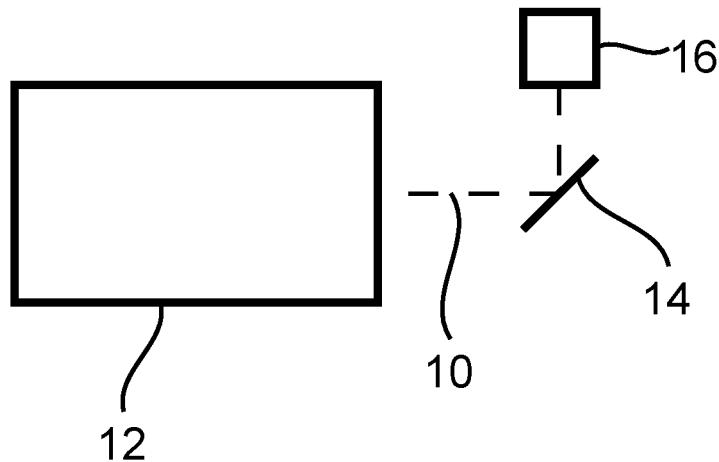
FIG. 1 shows an optical system
FIGS. 2a,b and 3 show cross-sections of a part of a mirror device

FIG. 1 shows an example of an optical system wherein a mirror device 14 with a controllably deformable mirror is used. The system comprises a telescope 12, mirror device 14 and a detector 16. The optical path 10 runs from telescope 12 to mirror device 14, which reflects optical path 10 to detector 16. Preferably, mirror device 14 is located at a pupil plane of telescope 12. Detector 16 may comprise optical elements (not shown) to focus the light from optical path 10 on a sensor (not shown) such as an image sensor or a spot sensor.

Figure 2A:
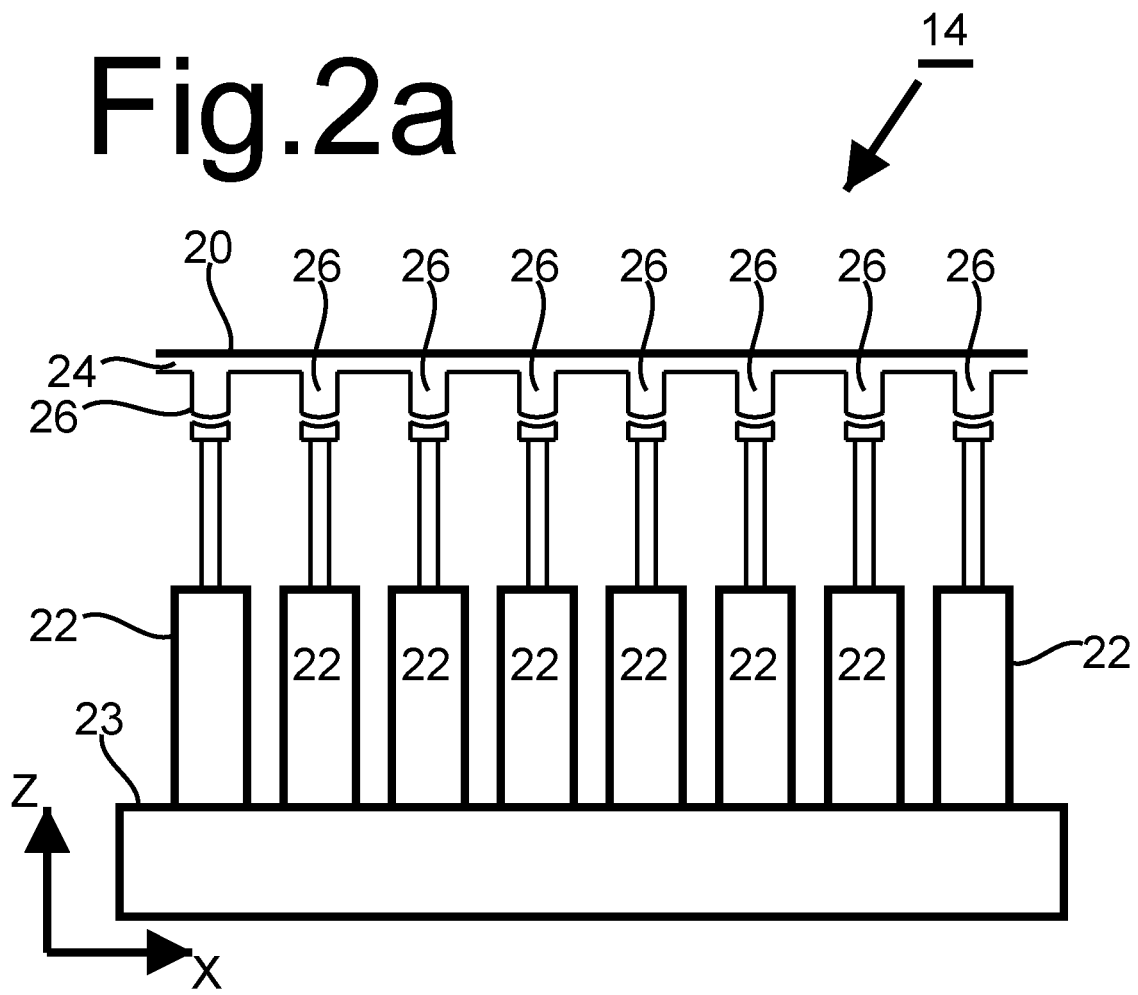

FIG. 2a shows a cross-section of part of a first embodiment of mirror device 14. Mirror device comprises a flexible mirror surface 20 and actuators 22 on a base 23. The figure shows only part of mirror surface 20 and base 23 with a few actuators, but it should be noted that mirror device 14 may comprise many more actuators, preferably in a two-dimensional array e.g. with rows and columns of at least ten actuators. The non-actuated shape of mirror surface 20 may be flat, or it may be curved to form a reflective imaging element, the surface of which can be locally deformed from the curved shape using actuators 22 (as used herein a reflective imaging element may have a positive or negative focal distance, so that the reflector can act as a lens to form an image on its own or to participate in imaging by a more complex optical system, as what could be called a "reflector lens"). In the illustrated embodiment, flexible mirror surface 20 is the front surface of an integral body 24 that is made of a single homogeneous material, e.g. of a metal. In another embodiment, integral body 24 may be made of metal or glass material with a reflective layer on top, which forms flexible mirror surface 20.

Adjacent flexible mirror surface 20, a part of integral body 24 forms a front layer that extends over the entire front surface of integral body 24, forming or supporting flexible mirror surface 20. This part of integral body 24 is so thin that it can be deformed under influence of forces exerted on protrusions 26. The front layer of integral body 24 may be 1-5 mm thick for example, and the surface may extend over 100 millimeter or more.

In an embodiment, integral body 24 has a plurality of elongated protrusions 26 at the back surface of integral body 24 (herein the back surface of integral body 24 is the part of integral body 24 between protrusions 26 and the interpolation of that part trough protrusions). Elongated protrusions 26 extend in a direction away from the back surface of the front layer (along the z direction as indicated). The front layer and protrusions 26 have the same material composition, and in the illustrated embodiment they form an integral body.

In other embodiments, the front layer and protrusions 26 may be attached to each other by an adhesive between the back surface of the front layer and protrusions 26, so that the front layer and protrusions 26 do not form an integral body. Preferably, the front layer and protrusions 26 are of the same material, so that their thermal expansion coefficients are equal. Alternatively, different materials with substantially the same thermal expansion coefficient may be used, e.g. with thermal expansion coefficients that differ by less than 5 ppm/Kelvin and more preferably less than 3 ppm/Kelvin at least in a predetermined temperature range (e.g. an operational temperature range of 250-320 Kelvin or further to lower temperatures, such as arise during use in space).

Examples of usable materials that have substantially the same thermal expansion coefficients are glass materials such as Zerodur, ULE, Fused Silica, Sitall, Clearceram, Borosilicate.

The size of the protrusions is designed to create a significant reduction on the effect on deformation of the flexible mirror surface 20 of adhesive on the distal end of protrusions 26 (i.e. a reduction of the effect by at least a factor of five or ten). For example protrusions 26 may extend for between one to five millimeter from the back surface. In an embodiment the distal end of protrusion 26 has a convex curved shape or partly has a convex curved shape that includes the point of protrusion 26 at its greatest distance from the back surface of integral body 24, and the greatest distance is at least half the radius of curvature of the convex curved part. Protrusions 26 may have any shape in cross section, for example circular, elliptical or rectangular. In a preferred embodiment a circular cross-section is used. The diameter of protrusions 26, i.e. the maximum distance between any pair of points on the circumference of the cross-section, is preferably less than or equal to twice its length. For example, the when the length is four millimeter, the diameter may be four millimeter. The distance between the outsides of neighboring protrusions 26 is preferably larger than their diameter, and more preferably more than twice their diameter. For example, the center to center distance may be twenty millimeter, or at least more than eight millimeter when the protrusions have a diameter of 4 millimeter.

Preferably, no significant amount of material other than that of integral body 24 is present on the front surface and back surface of integral body 24. Herein, a coating of not more than say ten micrometers is not regarded as a significant amount. Adhesive of a different material composition than that of integral body 24 may be present on the distal ends of protrusions 26. Due to the different composition, the adhesive creates stress, for example when it is cured and/or as a result of temperature variation. The magnitude of this stress decreases with distance from the adhesive along protrusions 26, thereby reducing its effect on the flexible mirror surface.

Respective ones of actuators 22 are attached to respective ones of protrusions 26, at the distal end, or at least a distance from the front layer of integral body 24. The amount of stress created by the attachment of the actuators decreases with distance between the attachment and the layer of integral body 24 that extends over the entire front surface of integral body 24.

FIG. 2b shows a cross-section of part of a second embodiment of mirror device 14 with a reflective mirror layer 28 is provided on integral body 24. In this embodiment, flexible mirror surface 20 is the front surface of reflective mirror layer 28 and the back surface of reflective mirror layer 28 is in spatially continuous contact with integral body 24 over the whole back surface of reflective mirror layer 28.

In other embodiments, one or more further layers (not shown) may be present between reflective mirror layer 28 and integral body 24 in spatially continuous contact with each other behind the whole back surface of reflective mirror layer 28. The combination of reflective mirror layer 28, and the part of integral body 24 that extends over the entire mirror surface and optionally the further layers is so thin that these can be deformed under influence of forces exerted on protrusions 26.

Integral body 24 may be manufactured for example from a plate of the single homogeneous material (e.g. aluminum), by milling to remove the material between protrusions 26. Mechanical milling may be used, or the material between protrusions 26 may be removed partly or wholly chemically or electrochemically. In other embodiments the protrusions may be grown by spatially selective deposition. The front surface of integral body 24 may be processed after the creation of protrusions 26 to form flexible mirror surface 20, or to create a thin and smooth surface to which reflective mirror layer 28 can spatially continuously be attached by material deposition or by attaching a pre-formed reflective mirror layer.

The use of protrusions from integral body 24 has the effect that the movement of reflective mirror layer 28 due to actuation is not affected by temperature fluctuations. Inherent mechanical stress in integral body 24 can be avoided, so that this does not affect reflective mirror layer 28. The use of protrusions from integral body 24 also makes it easier to process the front surface of integral body 24 at any time, compared to manufacturing methods wherein actuators are bonded directly to the part of integral body 24 that extends along the whole mirror surface 20.

Integral body 24 may consist of a metal or glass for example. The metal may be an alloy metal or a pure metal such as aluminum. When a metal is used, the front surface of the metal itself can be used as mirror surface or a mirror layer may be deposited on the front surface. When an integral body 24 of glass is used a mirror layer is preferably deposited on the front surface, for example by electroplating. In other embodiments a detachable mirror layer may be used.

Figure 3:
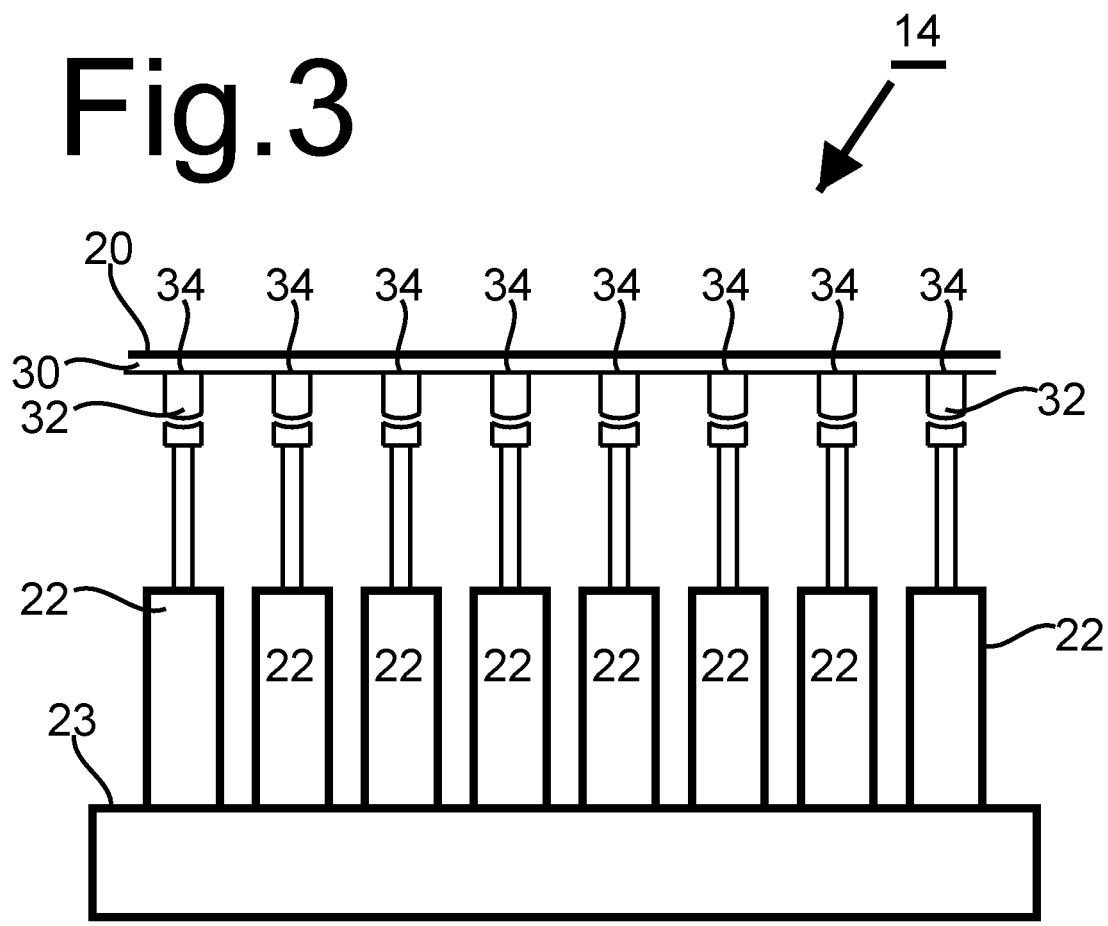

FIG. 3 shows a cross section of part of a further embodiment of the mirror device. Herein, the integral body has been created by bonding a flexible layer 30 with parallel front and back surfaces and protrusions 32 of the same material as layer 30. Protrusions 32 are bonded to layer 30 using anodic bonds 34 using no different material composition in the bond than the material of layer 30 and protrusions 32. Anodic bonding comprises bringing protrusions 32 into contact with layer 30, heating protrusions 32 and layer 30 when in contact, and applying an electrostatic field that extends through the contact between protrusions 32 and layer 30. Protrusions 32 may be brought into direct contact with layer 30 for the purpose of anodic bonding. The result is that effectively a homogeneous integral body is formed. Alternatively, a thin intermediate layer of a different material may be present between protrusions 32 and layer 30 so that the contact is indirect, through the intermediate layer, at the start of anodic bonding. A remnant of the intermediate layer may remain after the anodic bonding. As long as this intermediate layer is sufficiently thin (e.g. less than 10 micrometer), the bonded protrusions function like an integral body.

Figure 4:
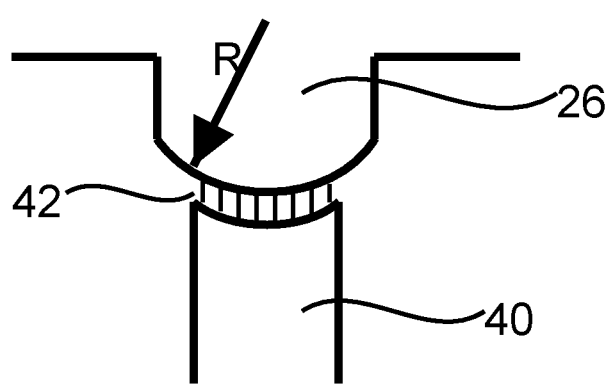
FIG. 4 shows an actuator and a protrusion.

FIG. 4 shows a detail of the moving (i.e. movable) part 40 of actuator and a protrusion 26, with adhesive 42 between moving part 40 of actuator and a protrusion 26. In this embodiment, the distal end of protrusion 26 has a convex part-spherical surface, with the center of the part-spherical surface on the central axis of protrusion 26. The part-spherical surface of protrusion 26 may be a hemi-spherical surface, or may consist of less than a hemisphere, as long as it is sufficiently large to receive the distal end of moving part 40. Moving part 40 preferably has a smaller cross-section than protrusion 26 and has a concave, part-spherical surface with the same radius of curvature as protrusion 26. This facilitates assembly, because it helps centering moving part 40 on protrusion 26. Furthermore, it helps to ensure that tilt of moving part 40 will not lead to tilt of protrusion 26 and deformation of the front surface integral body 24 due to the tilt. In the illustrated embodiment, this is due to the use of a protrusion 26 with a convex distal end in combination with a concave moving part 40 with a concave distal end. In FIG. 4, the radius of curvature is indicated by an arrow R from the center of curvature of the spherical surface part of protrusion 26. The center of curvature preferably lies between the front and back surface of integral body 24 or in one of these surfaces. This reduces deformation of the front surface integral body 24 due to tilt. When integral body 24 is curved to form a reflective imaging element, the center of curvature preferable lies midway between the front and back surface.

In other embodiments protrusions 26 may be attached to the flexible layer 30 by means of a layer of adhesive between protrusions 26 and the back surface of the flexible layer 30. On both the embodiments with anodic bonding and adhesive bonding, flexible layer 30 may be a flat layer, as shown in FIG. 3, the actuators being used to create deviations from a flat surface, or a curved layer, the actuators being used to create deviations from that curved surface.

In the embodiments wherein the protrusions 26 are be attached to the flexible layer 30 by means of anodic bonding or bonded by an adhesive, an assembly process may be used wherein protrusions 26 are pressed against the back surface of the flexible layer 30 by struts that have concave surfaces with the same radius of curvature as the distal end of the protrusions. Moving parts 40 may be used as struts for this.

Anodic bonding may be performed while the struts press protrusions 26 against the back surface of the flexible layer 30. Similarly, struts may press protrusions 26 against the back surface of the flexible layer 30 while an adhesive between protrusions 26 and the back surface cures (e.g. while a solvent evaporates or during polymerization in the adhesive). In an embodiment, the adhesive may first be applied to a proximal (e.g. planar) surface part of a protrusion 26 that has to be bonded to the back surface of the flexible layer 30, and the strut may be used to press the proximal surface part against the back surface of the flexible layer 30, with the applied adhesive in between.

This minimizes the effect of difference between thermal expansion of the layer of adhesive and the flexible layer and the protrusions, as it results in a thin layer that is absent on the back surface of the flexible layer outside the circumference of the protrusion.

Pressing by struts that have concave back surfaces with the same radius of curvature as the distal end of the protrusions has the advantage that once a protrusion 26 makes contact with the back surface of the flexible layer 30, the protrusion 26 will rotate due to the pressure until the surface part of the protrusion 26 becomes parallel to the back surface of the flexible layer 30 and the pressure is distributed evenly over the proximal surface part of the protrusion 26. This parallel orientation may be maintained during bonding, by anodic boding or curing of the adhesive. This has the effect that deformation during later use will be reduced.

The use of concave/convex surfaces makes it possible to keep the length directions of the moving parts of the actuators or other struts parallel to each other during bonding of the protrusions to the back surface of the flexible layer 30, even in embodiments wherein the flexible layer has a curved surface. During bonding the moving parts or other struts exert pressing forces on to the protrusions along the length directions of the actuators or other struts. These forces press the proximal surface parts of the protrusions against the back surface of the flexible layer 30. Use of concave/convex surfaces makes it possible to do so with the moving parts or struts in parallel. This simplifies manufacture, especially when the mirror forms an imaging element. When the moving parts are used to do so, this also ensures that the moving parts are in place for operational use.

When anodic bonding is used, the strut may be used as an electrode to apply an electric potential to the protrusion 26, as part of creating an electric field between the protrusion and the back surface.

When the moving parts 40 of the actuators are used as struts for this purpose, additional adhesive may be applied between each moving part 40 and the protrusion 26 against which it is pressed, before the protrusion 26 is pressed against the back surface of the flexible layer 30. Thus, an adhesive bond between moving part 40 and the protrusion 26 may be created by curing of the additional adhesive concurrently with bonding of the protrusion 26 to the back surface of the flexible layer 30, or afterwards. The moving parts actuators may be in connection to other parts of the actuators during bonding, or they may be connected only later.

Instead of using convex shaped protrusions and concave shaped struts/moving parts of the actuators, the shapes may be interchanged, by using concave shaped protrusions and convex shaped struts/moving parts of the actuators. Both provide for self-alignment of the protrusions and the moving parts of the actuators when they are connected. Optionally both also for alignment of the proximal end of the protrusions with respect to the back surface of the flexible layer, when the protrusions are on the moving parts when the protrusions are attached to the back surface of the flexible layer.

The directions along which distributed forces are exerted by the distal end of the moving part on the distal end of the protrusion converge on the center of curvature of the surfaces. Use of a protrusion with a convex distal end in combination with a moving part that has a concave distal end has the advantage that the center of curvature, is closer to or at the center of mass of the protrusion and the back surface of the flexible layer than in the case of to a protrusion with a concave distal end. Thus, these distributed forces produce less torque and are therefore less prone to cause local deformation of the flexible layer or alignment problems.

The invention claimed is:

1. A deformable mirror device, comprising
   a flexible layer having a front surface that forms a mirror surface or to which a mirror layer forming mirror surface is attached, the flexible layer consisting homogeneously of a first material;
   protrusions extending from, or attached to, a back surface of the flexible layer, the protrusions consisting homogeneously of the first material or a second material that has substantially a same thermal expansion coefficient as the first material,
   a plurality actuators, the actuators being coupled to the protrusions and via the protrusions to the flexible layer to deform the flexible layer, wherein coupled surfaces of a distal end of each protrusion and a distal end of a movable part of the actuator that is coupled to the protrusion respectively have different ones of (i) a convex surface that at least partly has a spherical shape, and (ii) a part-spherical concave surface with a same radius of curvature as the convex surface that at least partly has the spherical shape.

2. The deformable mirror device according to claim 1, wherein the flexible layer and the protrusions are part of an integral body of the first material.

3. The deformable mirror device according to claim 1, wherein the protrusions are anodically bonded to the flexible layer.

4. The deformable mirror device according to claim 1, wherein the distal end of each protrusion has the convex surface that at least partly has a spherical shape, and wherein the distal ends of movable parts of the actuators have the part-spherical concave surfaces with the same radius of curvature as the distal end of the protrusions.

5. The deformable mirror device according to claim 1, wherein the center of curvature of the spherical concave surface or surface part lies on or between the front and back surface of the flexible layer.

6. The deformable mirror device according to claim 5, wherein the center of curvature of the spherical concave surface or surface part lies midway between the front and back surface of the flexible layer.

7. A method of manufacturing a deformable mirror device wherein a deformable mirror surface is present on a front surface of a flexible layer, the method comprising:
   manufacturing the flexible layer from a body of a first material by:
      selectively removing the first material from the body to form a back surface of the flexible layer, the selectively removing leaving protrusions extending from a back surface of the flexible layer, or
      attaching the protrusions of the first material or a second material that has substantially the same thermal expansion coefficient as the first material to the back surface,
   wherein a distal end of each protrusion has a convex surface that at least partly has a spherical shape or a part-spherical concave surface; and
   coupling movable parts of actuators to the protrusions.

8. The method according to claim 7, wherein a proximal surface of each protrusion is attached to the back surface by bonding, the bonding being anodic bonding or bonding by an adhesive, the method comprising:
   pressing a proximal surface part of the protrusion against the back surface of the flexible layer during the bonding, exerting pressure on the protrusion using a strut that has a distal end that has a part-spherical concave surface with the same radius of curvature as the distal end of the protrusion when the distal end of the protrusion has a convex surface, or the distal end of each protrusion has a convex surface that at least partly has a spherical shape when the distal end of the protrusion has a concave surface.

9. The method according to claim 8, wherein the strut is formed by one of the movable parts of actuators.

10. The method according to claim 9, wherein a further adhesive is present between the protrusions and the movable parts of actuators during the bonding, and cured while or after the protrusion is bonded to the back surface.

11. The method according to claim 8, wherein the flexible layer has a curved surface, and wherein the struts pressing the proximal surface parts of all the protrusions are kept parallel to each other during the bonding.

* * * * *